US012487653B2

(12) United States Patent
Ahn

(10) Patent No.: US 12,487,653 B2
(45) Date of Patent: Dec. 2, 2025

(54) METHOD FOR CONTROLLING ELECTRONIC DEVICES AND ELECTRONIC DEVICE THEREOF

(71) Applicant: Samsung Electronics Co., Ltd., Suwon-si (KR)

(72) Inventor: Jeongho Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 18/159,986

(22) Filed: Jan. 26, 2023

(65) Prior Publication Data

US 2023/0236649 A1   Jul. 27, 2023

Related U.S. Application Data

(63) Continuation of application No. PCT/KR2023/000791, filed on Jan. 17, 2023.

(30) Foreign Application Priority Data

Jan. 27, 2022  (KR) .......... 10-2022-0011987
May 13, 2022  (KR) .......... 10-2022-0059143

(51) Int. Cl.
  *G06F 1/3212* (2019.01)
(52) U.S. Cl.
  CPC ................ *G06F 1/3212* (2013.01)
(58) Field of Classification Search
  CPC .... G06F 1/3212; G06F 1/3215; G06F 1/3234; G05B 2219/25186
  See application file for complete search history.

(56) References Cited

U.S. PATENT DOCUMENTS

| 9,949,205 | B2 | 4/2018 | Newham |
| 10,015,623 | B2 | 7/2018 | Thoen |
| 11,234,101 | B2* | 1/2022 | Tyagi ............ G08C 23/04 |
| 2013/0316642 | A1 | 11/2013 | Newham |
| 2015/0289308 | A1* | 10/2015 | Kang ............ H04W 12/068 455/41.2 |

(Continued)

FOREIGN PATENT DOCUMENTS

| CN | 108271090 A | 7/2018 |
| CN | 113115201 A | 7/2021 |

(Continued)

OTHER PUBLICATIONS

International Search Report dated Apr. 25, 2023, issued in International Application No. PCT/KR2023/000791.

(Continued)

*Primary Examiner* — Hyun Soo Kim
(74) *Attorney, Agent, or Firm* — Jefferson IP Law, LLP

(57) ABSTRACT

An electronic device is provided. The electronic device includes a memory, a battery, a speaker, a communication module, and at least one processor electrically connected to the memory, the battery, the speaker, and the communication module, wherein the at least one processor is configured to receive information indicating a wearing position from an external electronic device, and determine, based on the information indicating the wearing position of the external electronic device, whether to operate as a primary device among multiple electronic devices.

18 Claims, 9 Drawing Sheets

(56) References Cited

U.S. PATENT DOCUMENTS

| | | | |
|---|---|---|---|
| 2015/0341724 | A1 | 11/2015 | Pedersen et al. |
| 2016/0357510 | A1 | 12/2016 | Watson et al. |
| 2017/0155992 | A1 | 6/2017 | Perianu et al. |
| 2017/0164089 | A1 | 6/2017 | Lee et al. |
| 2017/0311105 | A1* | 10/2017 | Hariharan ............ H04R 29/001 |
| 2018/0173484 | A1* | 6/2018 | Zhang .................... G06F 1/163 |
| 2019/0182765 | A1* | 6/2019 | Newham ........... H04W 52/0206 |
| 2019/0327778 | A1 | 10/2019 | Morris et al. |
| 2020/0196372 | A1 | 6/2020 | Ouyang et al. |
| 2020/0351958 | A1* | 11/2020 | Lee ....................... H04W 76/15 |
| 2020/0396680 | A1* | 12/2020 | Murali ................... H04W 4/80 |
| 2022/0417645 | A1 | 12/2022 | Choi et al. |

FOREIGN PATENT DOCUMENTS

| | | |
|---|---|---|
| EP | 2 947 803 A1 | 11/2015 |
| JP | 2021-036635 A | 3/2021 |
| KR | 10-1533368 B1 | 7/2015 |
| KR | 10-2019-0090069 A | 7/2019 |
| KR | 10-2021-0053094 A | 5/2021 |
| KR | 10-2021-0116118 A | 9/2021 |
| WO | WO-2018013569 A1 * | 1/2018 |
| WO | 2020/117403 A1 | 6/2020 |
| WO | 2020/123056 A1 | 6/2020 |

OTHER PUBLICATIONS

Extended European Search Report dated Feb. 7, 2025, issued in European Application No. 23747235.2.

* cited by examiner

METHOD FOR CONTROLLING ELECTRONIC DEVICES AND ELECTRONIC DEVICE THEREOF

CROSS-REFERENCE TO RELATED APPLICATION(S)

This application is a continuation application, claiming priority under § 365(c), of an International application No. PCT/KR2023/000791, filed on Jan. 17, 2023, which is based on and claims the benefit of a Korean patent application number 10-2022-0011987, filed on Jan. 27, 2022, in the Korean Intellectual Property Office, and of a Korean patent application number 10-2022-0059143, filed on May 13, 2022, in the Korean Intellectual Property Office, the disclosure of each of which is incorporated by reference herein in its entirety.

TECHNICAL FIELD

The disclosure relates to a method for controlling multiple electronic devices, and the electronic devices. More particularly, the disclosure relates to a method for controlling multiple electronic devices based on various pieces of information generated between multiple electronic devices, and the electronic devices.

BACKGROUND ART

An electronic device, such as an earphone includes a speaker and a microphone and thus may output audio data, such as music or speech through the speaker and may acquire audio data through the microphone. Earphones including a communication module and a processor, in addition to the speaker and the microphone, have recently been developed. Such earphones may connect to various kinds of external electronic devices (or external electronic device), such as a mobile communication terminal, a personal digital assistant (PDA), an electronic wallet, a smartphone, a tablet personal computer, and a wearable device by using a short-range wireless technology, such as Bluetooth™, thereby transmitting/receiving various pieces of data or receiving and outputting audio data.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Multiple electronic devices, such as earphones have limited battery lifespans and communicate with an external electronic device in various situations for wireless communication.

Aspects of the disclosure are to address at least the above-mentioned problems and/or disadvantages and to provide at least the advantages described below. Accordingly, an aspect of the disclosure is to provide a method for controlling operations of multiple electronic devices for communication with an external electronic device in various situations in connection with multiple electronic devices, such as earphones.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a memory, a battery, a speaker, a communication module, and a processor electrically connected to the memory, the battery, the speaker, and the communication module, wherein the processor may receive information indicating a wearing position from an external electronic device, and determine, based on the information indicating the wearing position of the external electronic device, whether to operate as a primary device among multiple electronic devices.

In accordance with another aspect of the disclosure, a method of an electronic device is provided. The method includes receiving information indicating a position in which an external electronic device is worn from at least one of the multiple electronic devices, and determining, based on the information indicating the position in which the external electronic device is worn, that a first electronic device among the external electronic device plays a primary device role.

Advantageous Effects of Invention

According to various embodiments of the disclosure, operations of multiple electronic devices may be controlled such that, in connection with multiple electronic devices, such as earphones, audio data can be efficiently output for communication with an external electronic device in various situations.

According to various embodiments of the disclosure, roles of multiple electronic devices may be determined for efficient communication with an external electronic device, based on various pieces of situation information, and operations thereof may be controlled accordingly.

Other aspects, advantageous, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
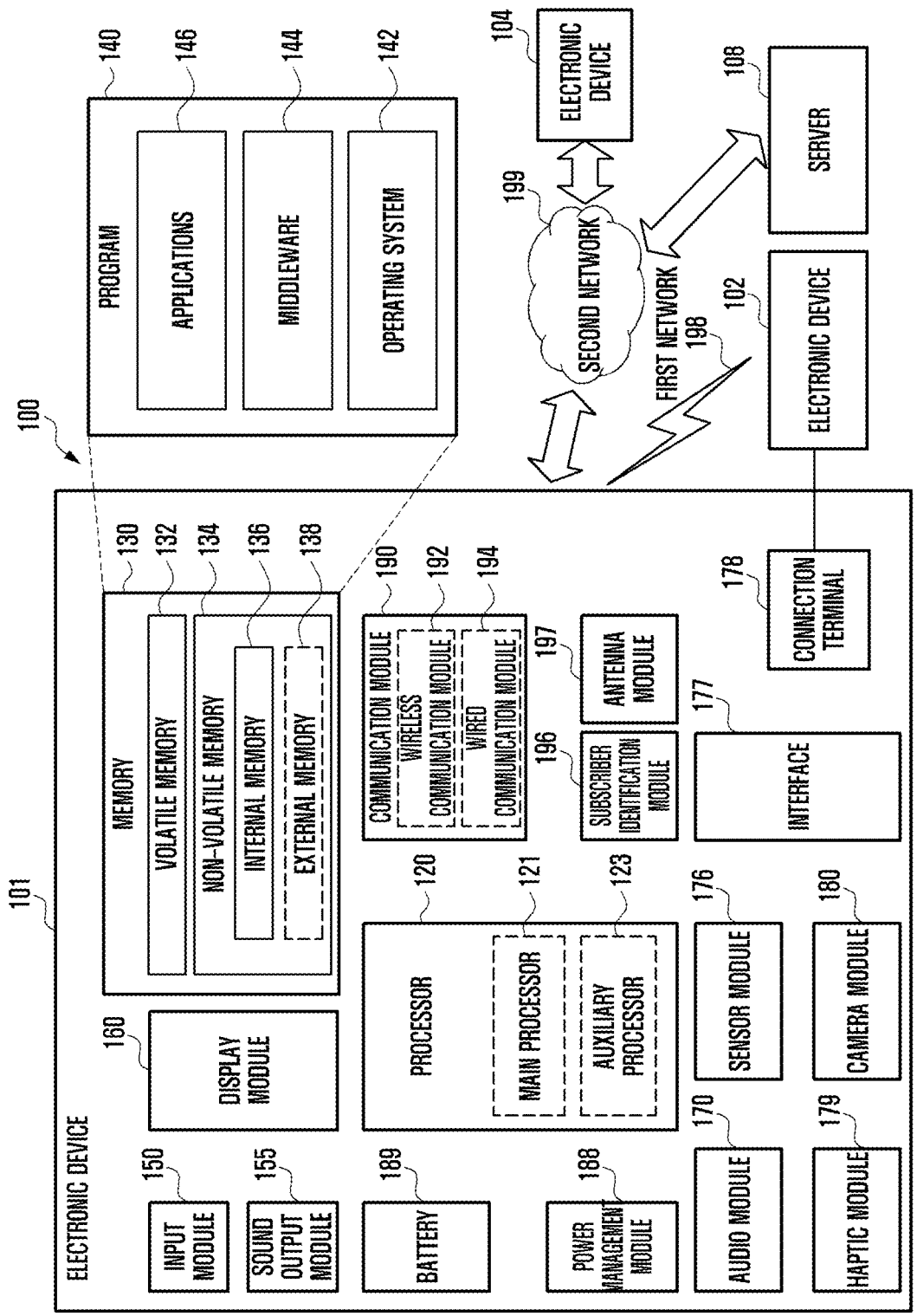
FIG. 1 is a block diagram of an electronic device inside a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form an mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
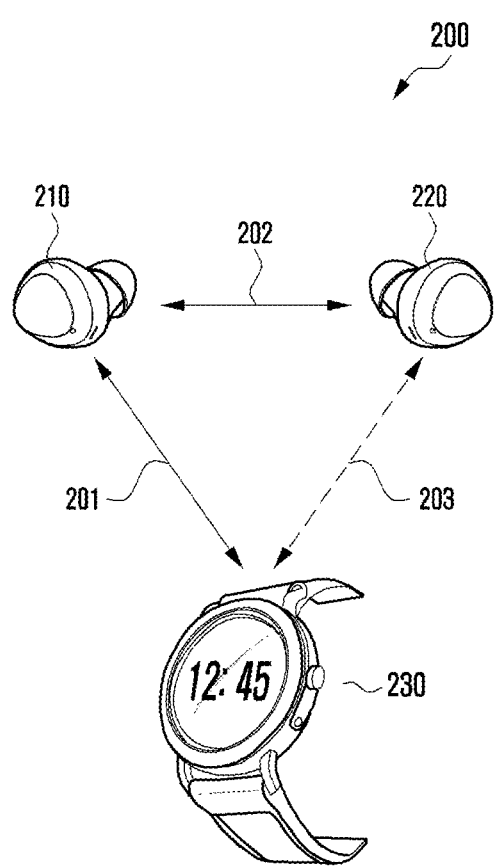
FIG. 2 illustrates a configuration of multiple electronic devices and an external electronic device according to an embodiment of the disclosure.

FIG. 2 is a diagram 200 illustrating a configuration of electronic devices 210 and/or 220 and an external electronic device 230 according to an embodiment of the disclosure.

Referring to FIG. 2, the electronic devices 220 and/or 230 may include a first electronic device 210 and/or a second electronic device 220. The first electronic device 210 and the second electronic device 220 may be worn by a user, and may include a headphone, an earphone, and/or an ear bud capable of providing the user with sounds based on audio data received from the external electronic device 230 through a communication function. It will be assumed in the following description that each of the first electronic device 210 and the second electronic device 220 are implemented as an ear bud, but various embodiments may not be limited thereto.

According to various embodiments of the disclosure, the external electronic device 230 may be a portable and/or mobile electronic device, such as a smartphone, a tablet personal computer (PC), a portable multimedia player (PMP), a personal digital assistant (PDA), a laptop PC, and a wearable device. It will be assumed in the following description that the external electronic device 230 is a wearable device that can be worn on the user's wrist, but various embodiments may not be limited thereto.

According to various embodiments of the disclosure, the external electronic device 230 may be an electronic device capable of playing music or videos, and may provide relevant audio data to the electronic devices 210 and/or 220.

According to various embodiments of the disclosure, the electronic devices 210 and/or 220 may be connected to the external electronic device 230 for wireless communication. For example, the external electronic device 230 may communicate with the first electronic device 210 or the second electronic device 220 by using a first communication link 201 or a third communication link 203 (for example, first network 198 in FIG. 1) including a short-range communication network, such as Bluetooth™ (or BLE), Wi-Fi Direct, or infrared data association (IrDA).

According to various embodiments of the disclosure, the first electronic device 210 and the second electronic device 220 may communicate with each other by using a second communication link 202 (for example, short-range wireless communication network).

According to an embodiment of the disclosure, based on information received from the external electronic device, one of the electronic devices 210 and/or 220 may play the role of a primary (or master) (for example, first electronic device 210) and may communication-connect with the external electronic device 230, and the other (for example, second electronic device 220) of the electronic devices 210 and/or 220 may play the role of a secondary (or slave) and may communication-connect with the first electronic device 210 (primary). When the first electronic device 210 and the second electronic device 220 are implemented as ear buds, the first electronic device 210 may be referred to as a primary earbud or primary equipment (PE), and the second electronic device 220 may be referred to as a secondary earbud or secondary equipment (SE). For example, the first electronic device 210 may communicate with the external electronic device 230 through the first communication link 201 as the primary, and the second electronic device 220 may communicate with the first electronic device 220 through the second communication link 202 as the secondary. In this case, the third communication link 203 between the second electronic device 220 and the external electronic device 230 may be in an idle state and/or unconnected state. For example, the second electronic device 220 may sniff the first communication link 201 between the first electronic device 210 and the external electronic device 230 as the secondary, thereby acquiring data transmitted from the external electronic device 230 to the first electronic device 210.

It may be assumed in the following description that, among the electronic devices 210 and/or 220, the first electronic device 210 plays the primary role during the initial operation, communication-connects with the external electronic device 230 through the first communication link 201, and transmits/receives data therewith, and the second electronic device 220 plays the secondary role, sniffs the first communication link 201, and acquires data. In this case, the third communication link 203 with the external electronic device 230 may be in an idle state and/or unconnected state.

According to an embodiment of the disclosure, the first electronic device 210 (primary) may undergo a role switch with the second electronic device 220 (secondary) such that the second electronic device 220 operates as the primary, connects with the external electronic device 230 through the third communication link 203, and communicates therewith. For example, the first electronic device 210 may switch the role to the slave, may communicate with the second electronic device 220 (primary) through the second communication link 202, and may sniff the third communication link 203, thereby acquiring data transmitted from the external electronic device 230 to the second electronic device 220. For example, after a role switch to the secondary, the first electronic device 210 may switch the first communication link 201 with the external electronic device 230 to an idle state and/or unconnected state.

According to another embodiment of the disclosure, the first electronic device 210 may acquire battery information according to various embodiments described later and may acquire various pieces of situation information from the external electronic device 230, thereby determining whether a role switch is necessary, and may switch the role with the second electronic device 220, if necessary, such that the second electronic device 220 performs communication with the external electronic device 230 as a primary device.

Figure 3:
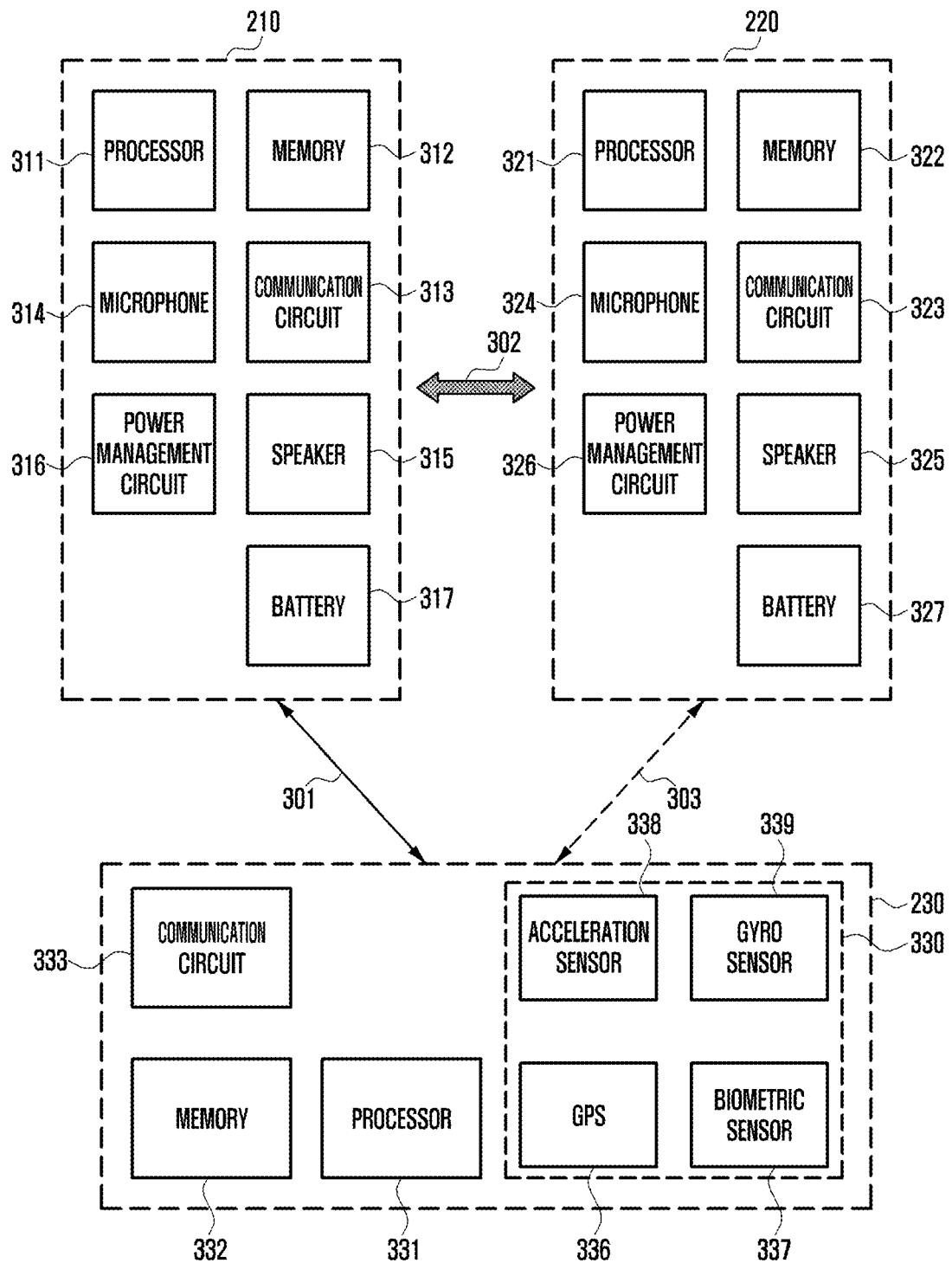
FIG. 3 is a block diagram of multiple electronic devices and an external electronic device according to an embodiment of the disclosure.

FIG. 3 is a block diagram of multiple electronic devices according to an embodiment of the disclosure.

Referring to FIG. 3, according to various embodiments of the disclosure, each of the first electronic device 210 or the second electronic device 220 may include a processor 311 or 321, a memory 312 or 322, a communication circuit 313 or 323, a microphone 314 or 324, a speaker 315 or 325, a power management circuit 316 or 326, and/or a battery 317 or 327.

The processor 311 or 321 may, for example, execute software (for example, program) so as to control at least one other component (for example, hardware or software component) of the first electronic device 210 or the second electronic device 220 connected to the processor 311 or 321, and may perform various data processing or operations.

The memory 312 or 322 may store various pieces of data used by at least one component (for example, processor 311 or 321) of the first electronic device 210 or the second electronic device 220. The data may include, for example, software (for example, program) and input data or output data regarding a command related thereto. The memory 312 or 322 may include a volatile memory or a nonvolatile memory.

According to an embodiment of the disclosure, the memory 312 or 322 may be coupled to the processor 311 or 321 and/or the communication circuit 313 or 323.

According to an embodiment of the disclosure, as at least a part of the data processing or operation, the processor 311 or 321 may load a command or data received from another component (for example, power management circuit 316 or 326 or communication circuit 313 or 323) in the volatile memory, may process the command or data loaded in the volatile memory, and may store the result data in the non-volatile memory.

The communication circuit 313 or 323 may support establishment of a communication channel between each of the first electronic device 210 or the second electronic device 220 and the external electronic device 230 and/or another electronic device (for example, second electronic device 220 or first electronic device 210) through a communication link (for example, a first communication link 301, second communication link 302, or third communication link 303) and/or communication performed through the established communication channel.

According to an embodiment of the disclosure, the communication circuit 313 or 323 may include a wireless communication module (for example, cellular communication module, short-range wireless communication module, or global navigation satellite system (GNSS) communication module) and a wired communication module.

According to an embodiment of the disclosure, the communication circuit 313 or 323 may communicate with the external electronic device 230 through the first communication link 301 or the third communication link 303 (for example, short-range wireless communication network, such as Bluetooth™, Wi-Fi Direct, or infrared data association (IrDA).

According to an embodiment of the disclosure, the communication circuit 313 or 323 may communicate with the second electronic device 220 or the first electronic device 210 through the second communication link 302 (for example, short-range wireless communication network, such as Bluetooth™, Wi-Fi Direct, or infrared data association (IrDA).

The communication circuit 313 or 323 may include an antenna module. The antenna module of the communication circuit 313 or 323 may transmit a signal and/or power to the outside (for example, external electronic device 230) or may receive the same from the outside. According to an embodiment of the disclosure, the antenna module of the communication circuit 313 or 323 may include one antenna including a radiator made of a conductor or a conductive pattern formed on a substrate (for example, PCB).

According to an embodiment of the disclosure, the antenna module may include multiple antennas. In this case, among the multiple antennas, the communication circuit 313 or 323 may select at least one antenna appropriate for the communication scheme used in the wireless communication network, such as the first communication link 301, the second communication link 302, and/or the third communication link 303. The signal or power may be transmitted or received between the communication circuit 313 or 323 and the external electronic device (for example, external electronic device 230) through the selected at least one antenna. According to some embodiments of the disclosure, a component (for example, RFIC) other than the radiator may be additionally formed as a part of the antenna module.

According to an embodiment of the disclosure, the processor 311 or 321 may calculate a posture value based on a sensor value acquired from an acceleration sensor 318 or 328 and/or a gyro sensor 319 or 329 of the sensor module 310 or 320. For example, the posture value may be expressed based on yaw, pitch, and roll values.

According to an embodiment of the disclosure, the speaker 315 or 325 may output an audio signal to the outside of the first electronic device 210 or the second electronic device 220.

The microphone 314 or 324 may convert an acquired sound to an electric signal. The processor 311 or 321 may output an electric signal processed by the processor 311 or 312 based on audio data received from the wirelessly connected external electronic device 230 as a sound.

The power management circuit 316 or 326 may manage power supplied to the first electronic device 210 or the second electronic device 220. The power management circuit 316 or 326 may control the battery 317 or 327 to be able to supply power necessary for each component of the first electronic device 210 or the second electronic device 220. The power management circuit 316 or 326 may control the charging state of the battery 317 or 327.

The power management circuit 316 or 326 may charge the battery 317 or 327 by using power supplied from an external power supply.

According to an embodiment of the disclosure, the power management circuit 316 or 326 may select a charging scheme (for example, normal charging or fast charging) based on at least some of the type of the external power supply (for example, power supply adapter, USB, or wireless charging), the magnitude of power that can be supplied from the external power supply, and/or the attribute of the battery 317 or 327, and may charge the battery 317 or 327 by using the selected charging scheme. The external power supply may be connected to the first electronic device 210 or the second electronic device 220 in a wired manner through a connector pin, for example, or may be wirelessly connected through an antenna included in the communication circuit 313 or 323.

The power management circuit 316 or 326 may determine charging state information related to charging of the battery 317 or 327 (for example, lifespan, overvoltage, low voltage, overcurrent, overcharging, over discharge, overheating, short-circuiting, or swelling), and may control the operation for charging the battery 317 or 327 based on the determined charging state information.

According to an embodiment of the disclosure, the processor 311 or 321 may identify the battery residual capacity level of the battery 317 or 327 through the power management circuit 316 or 326.

The battery 317 or 327 may supply power to at least one component of the first electronic device 210 or the second electronic device 220. According to an embodiment of the disclosure, the battery 317 or 327 may include, for example, a primary battery that is not rechargeable, a secondary battery that is rechargeable, and/or a fuel cell.

According to various embodiments of the disclosure, the external electronic device 230 may be a portable and/or mobile electronic device, such as a wearable device that can be worn on a wrist.

According to various embodiments of the disclosure, the external electronic device 230 may be an electronic device capable of playing music, and may provide resulting audio data to the first electronic device 210 and/or the second electronic device 220. The external electronic device 230 may include components identical or similar to at least some of the components of the electronic device 101 in FIG. 1.

According to an embodiment of the disclosure, the external electronic device 230 may include a processor 331, a memory 332, a communication circuit 333, and a sensor module 330.

The processor 331 may, for example, execute software (for example, program) so as to control at least one other component (for example, hardware or software component) of the external electronic device 230 connected to the processor 331, and may perform various data processing or operations.

The memory 332 may store various pieces of data used by at least one component (for example, processor 331 or communication circuit 333) of the external electronic device 230. The data may include, for example, software (for example, program) and input data or output data regarding a command related thereto. The memory 332 may include a volatile memory or a nonvolatile memory.

According to an embodiment of the disclosure, the memory 332 may be coupled to the processor 331 and/or the communication circuit 333.

According to an embodiment of the disclosure, as at least a part of the data processing or operation, the processor 331 may load a command or data received from another component (for example, the memory 332 or the communication circuit 323) in the volatile memory, may process the command or data loaded in the volatile memory, and may store the result data in the nonvolatile memory.

The communication circuit 333 may support establishment of a communication channel between the external electronic device 230 and the first electronic device 210 or the second electronic device 220 through a communication link (for example, first communication link 301 or third communication link 303) and/or communication performed through the established communication channel.

According to an embodiment of the disclosure, the communication circuit 333 may include a wireless communication module (for example, cellular communication module, short-range wireless communication module, or global navigation satellite system (GNSS) communication module) or a wired communication module.

According to an embodiment of the disclosure, the communication circuit 333 may communicate with the first electronic device 210 or the second electronic device 220 through the first communication link 301 or the third communication link 303 (for example, short-range wireless communication network, such as Bluetooth™, Wi-Fi Direct, or infrared data association (IrDA).

According to various embodiments of the disclosure, the processor 331 may render audio data based on a posture value received from the first electronic device 210 or the second electronic device 220 through the first communication link 301 or the third communication link 303, and may transmit the rendered audio data to the first electronic device 210 or the second electronic device 220 through the first communication link 301 or the third communication link 303.

The sensor module 330 may include a global positioning system (GPS) 336, a biometric sensor 337, an acceleration sensor 338, and/or a gyro sensor 339.

The GPS 336 may acquire position information of the external electronic device 230. For example, the external electronic device 230 may identify whether the external electronic device 230 is positioned outdoors, based on position information acquired through the GPS 336. In addition to or instead of using the GPS 336, the external electronic device 230 may acquire position information through communication with various pieces of wireless communication equipment positioned in peripheral environments through wireless communication, thereby identifying whether the external electronic device 230 is currently positioned outdoors.

The biometric sensor 337 (for example, photoplethysmography (PPG) sensor) may emit light to a skin surface on which a human blood vessel is positioned, and may receive reflected light of the emitted light, thereby acquiring a sensor value (for example, raw sensor signal). For example, the external electronic device 230 may identify biometric information, such as the user's heart rate information and/or hear rate variation, based on the sensor value, and may identify whether the user is currently exercising.

The acceleration sensor 338 and/or the gyro sensor 339 may detect the movement and/or inertia of the external electronic device 230. The acceleration sensor 338 and/or the gyro sensor 339 may include a circuit (for example, integrated circuit (IC)) configured to control operations of the acceleration sensor 338 and/or the gyro sensor 339. For example, the circuit (for example, integrated circuit (IC)) configured to control operations of the acceleration sensor 338 and/or the gyro sensor 339 may be included in the external electronic device 230 and may be implemented as a processor 331. The external electronic device 230 may determine whether the user is currently exercising, based on a sensor value from at least one of the biometric sensor 337, the acceleration sensor 338, and/or the gyro sensor 339.

Figure 4:
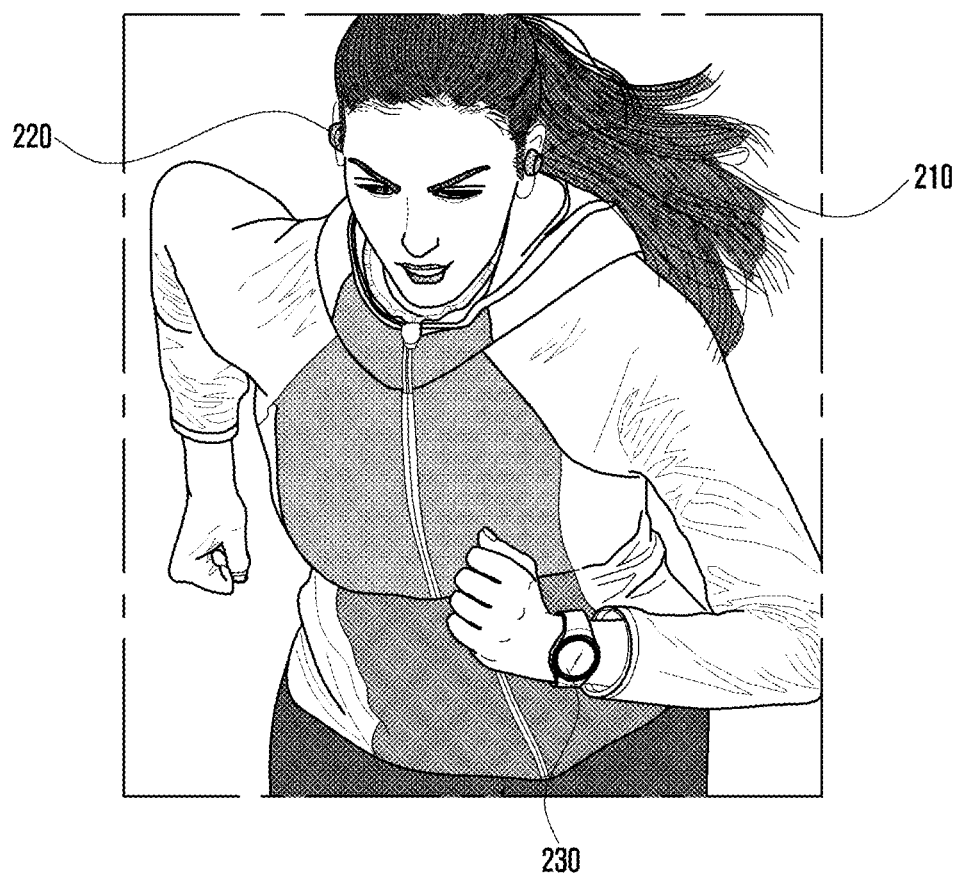
FIG. 4 illustrates operations of multiple electronic devices and an external electronic device according to an embodiment of the disclosure.

FIG. 4 illustrates operations of multiple electronic devices and an external electronic device according to an embodiment of the disclosure.

Referring to FIG. 4, the multiple electronic devices (for example, first electronic device 210 and second electronic device 220 in FIG. 2 or 3) may be worn on the user's left and right ears as earphones, respectively. The external electronic device (for example, external electronic device 230 in FIG. 2 or 3) may be a wrist-worn wearable device, such as Galaxy Watch, for example, and may be worn on the user's left wrist, for example.

When the external electronic device 230 is worn on the user's left wrist, for example, and when the second electronic device 220 worn on the user's right ear is implemented as the primary device, the human body may act as an obstacle which interferes with efficient data reception because BT signals from the external electronic device 230 are attenuated, and in the case of audio data that needs to be received continuously, in particular, the data may be partially lost, thereby causing a sound interruption phenomenon. Such a phenomenon may occur more frequently in an environment having infrequent signal reflection (for example, outdoors) and/or when the user exercises while maintaining arms and the upper body at a short distance such that the human body easily acts as an obstacle.

According to an embodiment of the disclosure, the first electronic device 210 worn in the same direction, with reference to the position in which the external electronic device 230 is worn (for example, the first electronic device 210 is worn on the left ear, when the external electronic device 230 is worn on the left wrist) may be implemented as the primary device, thereby reducing sound interruptions.

For example, according to the result of testing the number of sound interruptions while playing a sound source for four minutes using an SCB codec as audio streaming, no sound interruption occurred during an indoor or outdoor exercise or even during no exercise when the first electronic device 210 worn in the same direction, with reference to the position in which the external electronic device 230 is worn (for example, the first electronic device 210 is worn on the left ear, when the external electronic device 230 is worn on the left wrist) is implemented as the primary device.

In contrast, when the second electronic device 220 worn in a different direction, with reference to the position in which the external electronic device 230 is worn (for example, when the second electronic device 210 is worn on the right ear, when the external electronic device 230 is worn on the left wrist) is implemented as the primary device, the test result indicates that sound interruption occurs ten times or more during an outdoor exercise, three times or less when not exercising outdoors, and four to ten times during an indoor exercise.

According to an embodiment of the disclosure, the first electronic device 210 and/or the second electronic device 220 may receive information regarding the position in which the external electronic device 230 is worn, thereby determining the device to play the primary role.

For example, a current consumption test shows that, when the external electronic device 230 is worn in the left position, when the second electronic device 220 worn on the right ear (different direction) operates as the primary device, and when the TB communication power is used in the high power mode to prevent sound interruption, a current of about 100 mA or more could be consumed. In contrast, when the first electronic device 210 worn on the left ear operates as the primary device, the RF electric field is stabilized, thereby making is possible to use the BT communication power in a normal mode, and the current consumption could thus be about 28 mA or less. Therefore, it was confirmed that the battery availability time could be increased about 3.6 times by implementing the first electronic device 210 in the same direction as the external electronic device 230 as the primary device.

It will be assumed in the following description that the external electronic device 230 is worn on the left wrist, and that the first electronic device 210 worn on the left ear operates as the primary device, but various embodiments are not limited thereto.

An electronic device according to various embodiments (for example, first electronic device 210 in FIG. 2, 3, or 4) may include a memory (for example, the memory 312 in FIG. 3), a battery (for example, battery 317 in FIG. 3), a speaker (for example, speaker 315 in FIG. 3), a communication module (for example, communication module 313 in FIG. 3), and a processor (for example, processor 311 in FIG. 3) electrically connected to the memory, the battery, the speaker, and the communication module. The processor may be configured to receive information indicating a wearing position from an external electronic device (for example, external electronic device 230 in FIG. 2, 3, or 4) and determine, based on the information indicating the wearing position of the external electronic device, whether to operate as a primary device among multiple electronic devices.

According to various embodiments of the disclosure, the processor may determine the electronic device as the primary device when the electronic device is worn in a direction identical to the wearing position of the external electronic device.

According to various embodiments of the disclosure, the processor may determine whether to change the primary device role, based on battery level information of the multiple electronic devices, when the electronic device is determined as the primary device.

According to various embodiments of the disclosure, the processor may determine whether to change the primary device role when a difference in battery level is equal to or greater than a designated value, based on battery level information of the battery and battery level information of a second electronic device determined as a secondary device among the multiple electronic devices.

According to various embodiments of the disclosure, the processor may be configured to receive situation information from the external electronic device and determine whether to change the primary device role by additionally considering the situation information.

According to various embodiments of the disclosure, the situation information may include position information of the external electronic device and information regarding whether a wearer of the external electronic device is exercising or whether audio data is transmitted from the external electronic device.

According to various embodiments of the disclosure, when the position information of the external electronic device indicates an outdoor position, the processor may determine to change the primary device role when the wearer is not exercising, and when the audio data is not transmitted, and when the position information of the external electronic device indicates an outdoor position, the processor may determine to maintain the primary device role when the wearer is exercising, or when the audio data is transmitted.

According to various embodiments of the disclosure, when the position information of the external electronic device indicates an indoor position, the processor may determine to change the primary device role when the wearer is not exercising, or when the audio data is not transmitted, and when the position information of the external electronic device indicates an indoor position, the processor may determine to maintain the primary device role when the wearer is exercising, and when the audio data is transmitted.

According to various embodiments of the disclosure, when a determination is made to change the primary device role, the processor may transmit a signal related to the primary device role change to a different electronic device operating as a secondary device among the multiple electronic devices.

According to various embodiments of the disclosure, when the electronic device is determined as the primary device, based on information indicating a position in which the external electronic device is worn, while the electronic device operates as a secondary device, the processor may transmit a primary device role change request signal to a different electronic device determined as a secondary among the multiple electronic devices.

Figure 5:
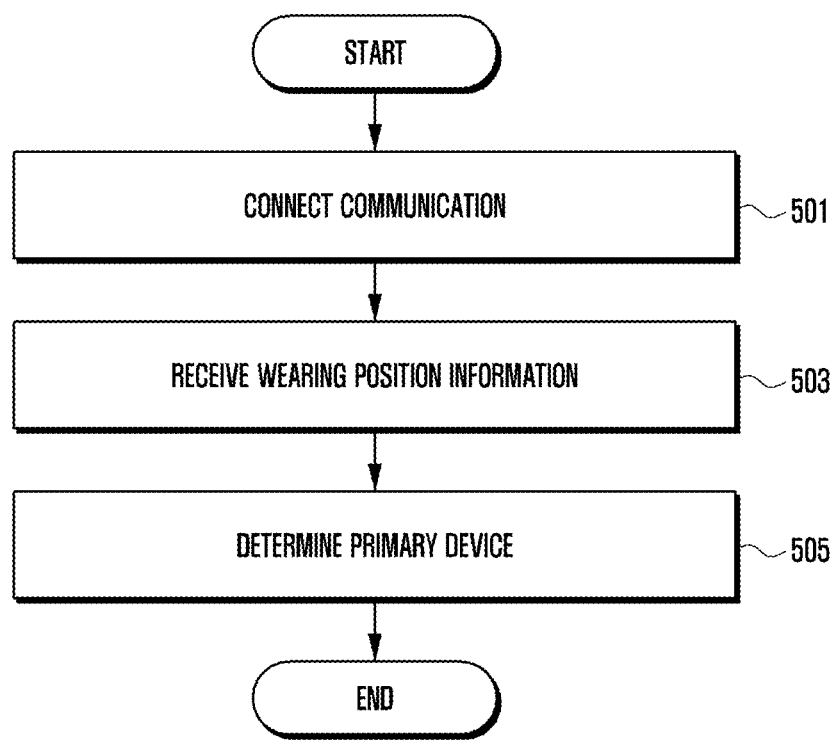
FIG. 5 illustrates a flowchart illustrating operations for controlling multiple electronic devices according to an embodiment of the disclosure.

FIG. 5 illustrates a flowchart illustrating operations for controlling multiple electronic devices according to an embodiment of the disclosure.

Referring to FIG. 5, the first electronic device 210 and/or the second electronic device 220 may connect communication with an external electronic device (for example, external electronic device 230 in FIG. 2 or 3) in operation 501, may receive information regarding the position in which the external electronic device 230 is worn in operation 503, and may determine a primary device based thereon in operation 505.

The first electronic device 210 and/or the second electronic device 220 may connect to the external electronic device 230 by using a first communication link 201 and/or a third communication link 203 (for example, first network 198 in FIG. 1) including a short-range communication network, such as Bluetooth™ (or BLE), Wi-Fi Direct, or infrared data association (IrDA) and may perform wireless communication, thereby receiving information regarding the position in which the external electronic device 230 is worn.

According to an embodiment of the disclosure, the information regarding the position in which the external electronic device 230 is worn may include information including one of left wrist or right wrist. The information regarding the position in which the external electronic device 230 is worn may be input from and configured by the user during the initial configuration of the external electronic device 230, for example, and may be stored in the memory (for example, the memory 332 in FIG. 3) of the external electronic device 230.

According to an embodiment of the disclosure, the information regarding the position in which the external electronic device 230 is worn may be delivered to the first electronic device 210 and/or the second electronic device 220 during the initial phase of communication connection between the external electronic device 230 and the first electronic device 210 and/or the second electronic device 220. When the position in which the external electronic device 230 is worn is not pre-stored in the memory 332, wearing position information that has been input according to a user input through the external electronic device 230 in the initial phase of communication connection may be delivered to the first electronic device 210 and/or the second electronic device 220.

According to an embodiment of the disclosure, when no information regarding the position in which the external electronic device 230 is worn has been configured, the left may be configured as default wearing position information, for example, or based on the signal strength (RSSI) value regarding communication between each of the first electronic device 210 and the second electronic device 220 and the external electronic device 230, the device having a stronger signal strength (for example, on average at least 20 dB higher for five seconds) may be configured as the primary device, for example.

Referring to the example in FIG. 4, based on wearing position information of the external electronic device 230 worn on the left wrist, the first electronic device 210 worn on the left ear (same direction) may be determined as the primary device, for example, and may operate as the primary device. It will be assumed in the following description that the first electronic device 210 is determined and thus operates as the primary device based on information regarding the position in which the external electronic device 230 is worn.

According to an embodiment of the disclosure, the first electronic device 210 determined as the primary device may wirelessly communicate with the second electronic device 220, as the primary device, by using a second communication link 202 (for example, first network 198 in FIG. 1) including a short-range communication network, such as Bluetooth™ (or BLE), Wi-Fi Direct, or infrared data association (IrDA).

Figure 6:
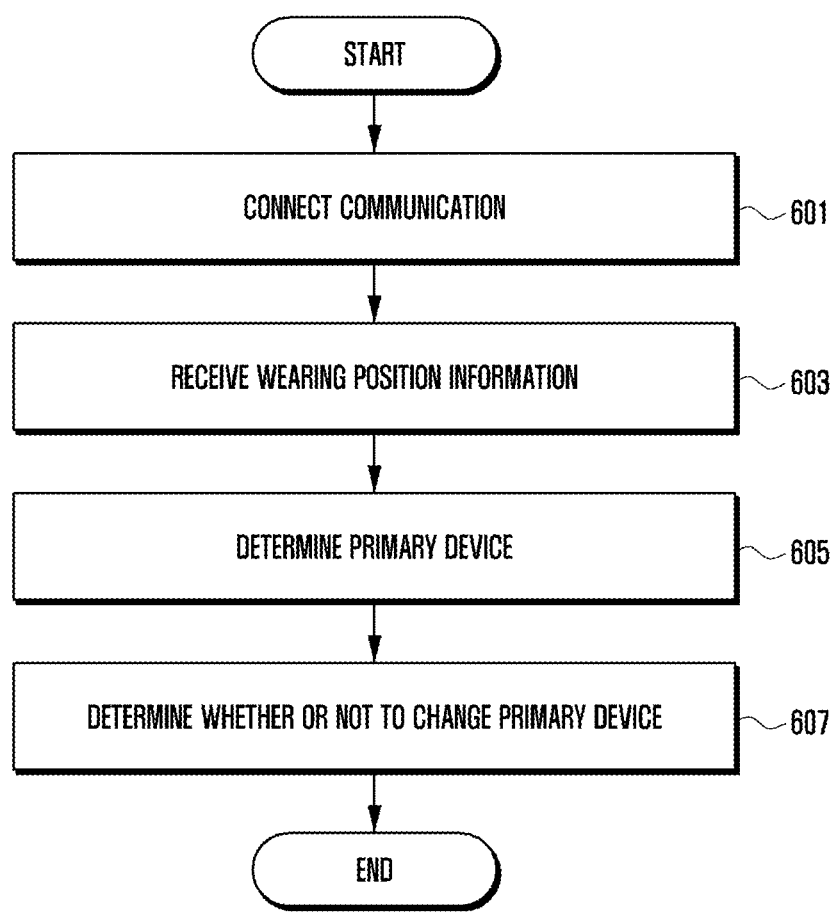
FIG. 6 illustrates a flowchart illustrating operations for controlling multiple electronic devices according to an embodiment of the disclosure.

FIG. 6 illustrates a flowchart illustrating operations for controlling multiple electronic devices according to an embodiment of the disclosure.

Referring to FIG. 6, the multiple electronic devices (for example, first electronic device 210 and/or second electronic device 220 in FIG. 2 or 3) may connect communication with an external electronic device (for example, external electronic device 230 in FIG. 2 or 3) in operation 601, may receive information regarding the position in which the external electronic device 230 is worn in operation 603, and may determine a primary device based thereon in operation 605.

According to an embodiment of the disclosure, the first electronic device 210 and/or the second electronic device 220 may connect to the external electronic device 230 through wireless communication with the external electronic device 230 by using a first communication link 201 or a third communication link 203 (for example, first network 198 in FIG. 1) including a short-range communication network, such as Bluetooth™ (or BLE), Wi-Fi Direct, or infrared data association (IrDA).

According to an embodiment of the disclosure, the information regarding the position in which the external electronic device 230 is worn may include information including one of left wrist or right wrist. It will be assumed in the following description with reference to the example in FIG. 4 that, based on the wearing position information of the external electronic device 230 worn on the left wrist, the first electronic device 210 worn in the left ear (same direction) is determined as the primary device, but various embodiments are not limited thereto.

According to an embodiment of the disclosure, the first electronic device 210 operating as the primary device or the external electronic device 230 may determine whether to change the primary device role, based on various pieces of information, in operation 607. When the first electronic device 210 operating as the primary device determines whether to change the primary device role, the first electronic device 210 may acquire various pieces of information from the first electronic device 210, the second electronic device 220, and the external electronic device 230. When the external electronic device 230 determines whether to change the primary device role, the external electronic device 230 may acquire various pieces of information from the external electronic device 230 and the first electronic device 210.

According to an embodiment of the disclosure, the first electronic device 210 operating as the primary device may identify battery residual capacity information of the first electronic device 210 and the second electronic device 220, and may determine whether it is necessary to change the primary device role, based thereon. For example, when the difference in battery residual capacity between the first electronic device 210 and the second electronic device 220 is equal to or greater than a preconfigured value (for example, equal to or greater than 5%), it may be deemed necessary to change the primary device role.

According to an embodiment of the disclosure, the first electronic device 210 may receive various pieces of situation information, such as position information, exercise information, and/or audio signal information from the external electronic device 230, and may determine whether to change the primary device role, based thereon. The various pieces of received information may include, for example, situation information regarding the possible occurrence of sound interruption. For example, the position information may include whether the external electronic device 230 is currently positioned outdoors. For example, the exercise information may include information indicating whether the user who wears the external electronic device 230 is currently exercising. For example, the audio signal information may include whether the first electronic device 210 receives a sound signal including audio data from the external electronic device 230. For example, whether audio data is received may be identified by confirming whether the first electronic device 210 is receiving a sound signal through BT call, based on a Bluetooth™ communication protocol, through a communication circuit (for example, communication circuits 313 and/or 333 in FIG. 3), for example.

Table 1 below gives an example of determining whether to change the primary device according to various pieces of situation information.

TABLE 1

| Status | Place | Whether exercising or not | Whether voice signal exists or not | Whether to change role |
|---|---|---|---|---|
| 1 | Indoor | x | x | o |
| 2 | Indoor | x | o | o |
| 3 | Indoor | o | x | o |
| 4 | Indoor | o | o | x |
| 5 | Outdoor | x | x | o |
| 6 | Outdoor | x | o | x |
| 7 | Outdoor | o | x | x |
| 8 | Outdoor | o | o | x |

For example, when it is deemed necessary to change the primary role, based on the difference in battery level between the first electronic device 210 and the second electronic device 220, and when the current position is outdoor, the role may be changed at a timepoint at which the user is not exercising, and at which no sound signal is received. The primary device role may be maintained if the user is exercising outdoors, or if a sound signal is received. For example, when it is deemed necessary to change the primary role, based on the difference in battery level between the first electronic device 210 and the second electronic device 220, and when the current position is indoor, the role may be changed at a timepoint at which the user is not exercising, or at which no sound signal is received. The primary device role may be maintained if the user is exercising indoors, and if a sound signal is received.

According to an embodiment of the disclosure, even when it is deemed necessary to change the primary role, based on the difference in battery level between the first electronic device 210 and the second electronic device 220, and even when the role is to be maintained (not changed) based on various pieces of situation information, the role may be changed if the battery level is all 25% or less, for example. In this case, the external electronic device 230 may be controlled to transmit signals at the maximum output, or retransmission priority may be assigned to audio data, thereby minimizing sound interruption.

Figure 7:
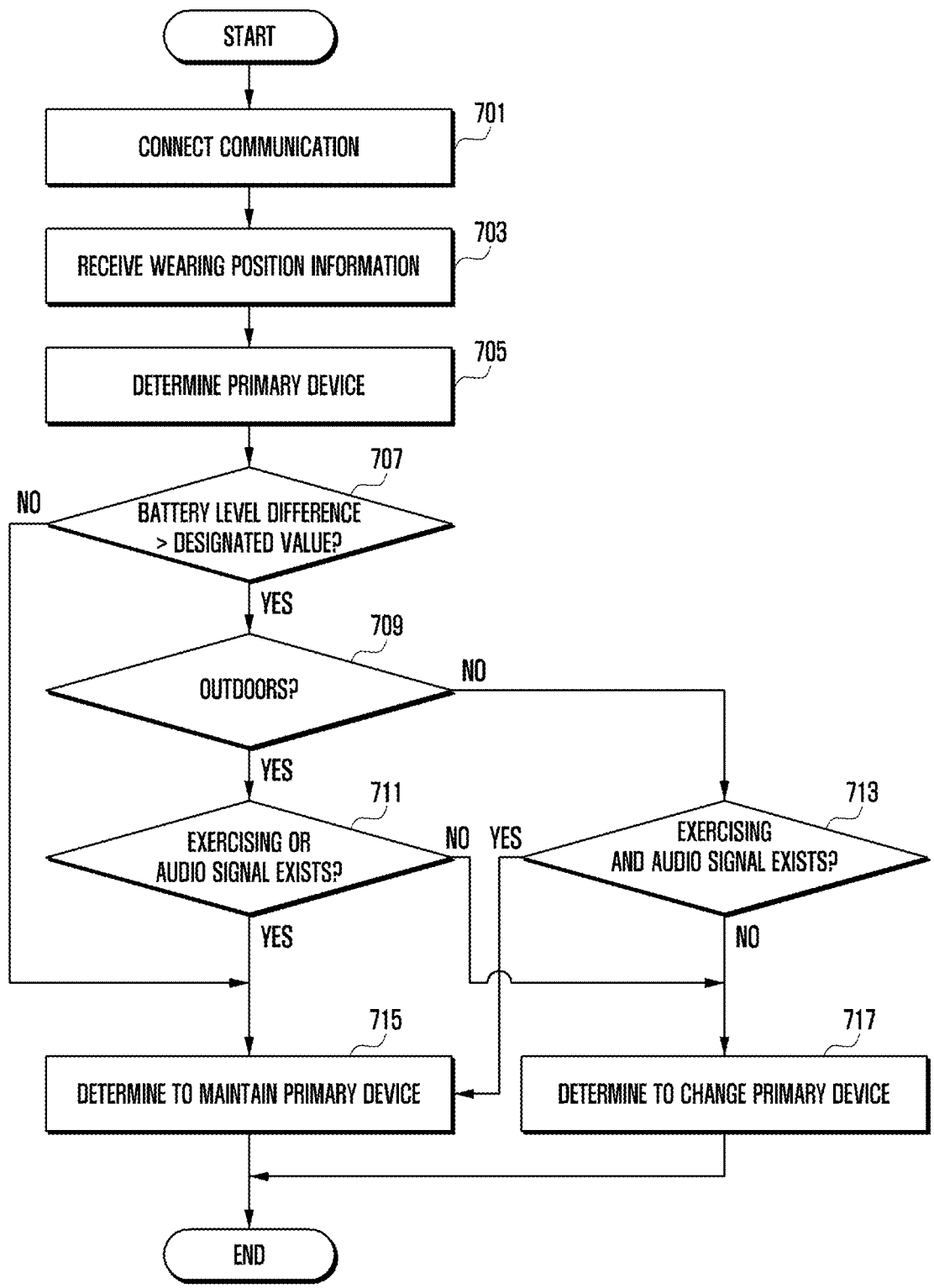
FIG. 7 illustrates a flowchart illustrating operations for controlling multiple electronic devices according to an embodiment of the disclosure.

FIG. 7 illustrates a flowchart illustrating operations for controlling multiple electronic devices according to an embodiment of the disclosure.

Referring to FIG. 7, the multiple electronic devices (for example, first electronic device 210 and/or second electronic device 220 in FIG. 2 or 3) may connect communication with an external electronic device (for example, external electronic device 230 in FIG. 2 or 3) in operation 701, may receive information regarding the position in which the external electronic device 230 is worn in operation 703, and may determine a primary device based thereon in operation 705. Detailed descriptions of operations identical or similar to those described with reference to FIG. 5 or 6 may be omitted herein.

The first electronic device 210 and/or the second electronic device 220 may connect to the external electronic device 230 through wireless communication with the external electronic device 230 by using a first communication link 201 or a third communication link 203 (for example, first network 198 in FIG. 1) including a short-range communication network, such as Bluetooth™ (or BLE), Wi-Fi Direct, or infrared data association (IrDA).

According to an embodiment of the disclosure, the information regarding the position in which the external electronic device 230 is worn may include information including one of left wrist or right wrist. It will be assumed in the following description with reference to the example in FIG.

4 that, based on the wearing position information of the external electronic device 230 worn on the left wrist, the first electronic device 210 worn in the left ear (same direction) is determined as the primary device, but various embodiments are not limited thereto.

According to an embodiment of the disclosure, the first electronic device 210 operating as the primary device or the external electronic device 230 may identify whether the difference in battery level between the first electronic device 210 and the second electronic device 220 is equal to or greater than a designated value in operation 707. For example, the first electronic device 210 or the external electronic device 230 may identify, based on battery residual capacity information of the two devices, whether the battery residual capacity of the first electronic device 210 differs from the battery residual capacity of the second electronic device 220 by 5% or more, for example.

According to an embodiment of the disclosure, when the difference in battery level is equal to or greater than the designated value, the first electronic device 210 or the external electronic device 230 may proceed to operation 709 and identify whether current position is outdoor. The external electronic device 230 may acquire various pieces of situation information, such as position information, exercise information, and/or audio signal information. The external electronic device 230 may acquire position information of the external electronic device 230 and exercise information, based on sensor values from at least one of the GPS 336, the biometric sensor 337, the acceleration sensor 338, and/or the gyro sensor 339 of the sensor module (for example, sensor module 330 in FIG. 3), for example. The external electronic device 230 and the first electronic device 210 may acquire audio signal information based on whether an audio signal stream is transmitted in connection with a communication protocol transmitted from the external electronic device 230 to the first electronic device 210. The first electronic device 210 may receive position information of the external electronic device 230 and exercise information from the external electronic device 230.

According to an embodiment of the disclosure, when the current position is outdoor (Y in operation 709), the first electronic device 210 or the external electronic device 230 may proceed to operation 711 and may identify whether the user is exercising, or whether an audio signal is received. If the user is exercising, or if an audio signal is received, the first electronic device 210 or the external electronic device 230 may proceed to operation 715 and may determine to maintain the primary device role. In contrast, when it is identified in operation 711 that the user is not exercising, and that no sound signal is received, the first electronic device 210 or the external electronic device 230 may proceed to operation 717 and may determine to change the primary role.

According to an embodiment of the disclosure, when the current position is indoor (N in operation 709), and if it is identified in operation 713 that the user is exercising indoors, and that an audio signal is received, the first electronic device 210 and the second electronic device 220 may proceed to operation 715 and may determine the maintain the primary device role. In contrast, if it is determined in operation 713 that the user is not exercising, or that no audio signal is received, the first electronic device 210 and the second electronic device 220 may proceed to operation 717 and may change the primary device role.

According to an embodiment of the disclosure, when the external electronic device 230 performs the operations described above with reference to FIG. 7, the external electronic device 230 may receive battery level information of the first electronic device 210 and the second electronic device 220 from the first electronic device 210 determined as the primary device based on wearing position information, and may determine whether to change the primary device role based on the situation information. When the external electronic device 230 has determined to change the primary device role, the external electronic device 230 may transmit a message to the first electronic device 210 to instruct the same to change the primary device role.

Figure 8:
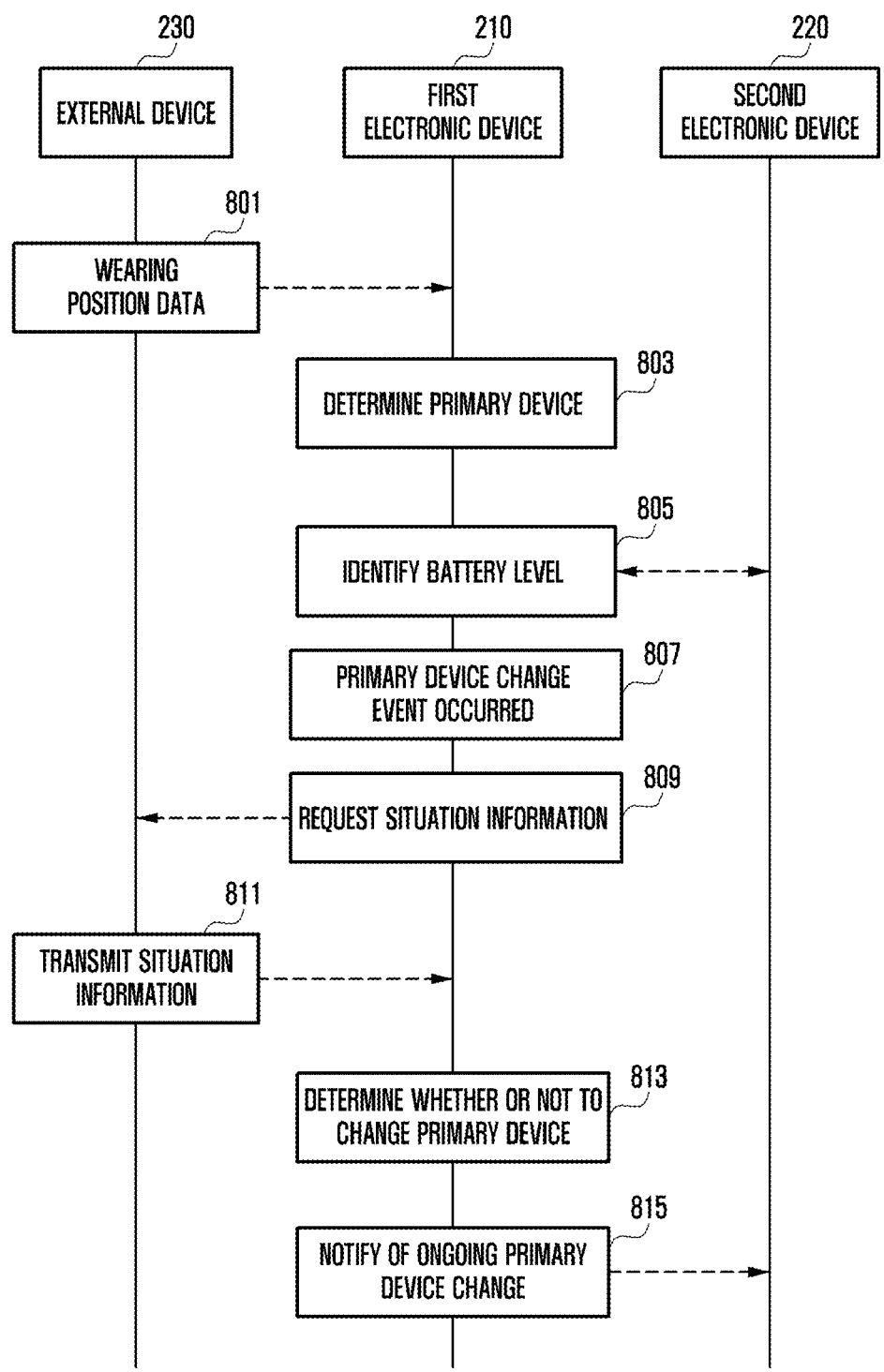
FIG. 8 is a flowchart illustrating signals between multiple electronic devices and an external electronic device according to an embodiment of the disclosure.

FIG. 8 is a flowchart illustrating signals between multiple electronic devices and an external electronic device according to an embodiment of the disclosure.

Referring to FIG. 8, the multiple electronic devices (for example, first electronic device 210 and/or second electronic device 220 in FIG. 2 or 3) may receive wearing position data of an external electronic device (for example, electronic device 230 in FIG. 2 or 3) in operation 801.

According to an embodiment of the disclosure, based on the receive wearing position data of the external electronic device 230, the first electronic device 210 worn in the same direction may determine a primary device, based on the receive wearing position data of the external electronic device 230, in operation 803. For example, while the first electronic device 210 operates as the primary device, the first electronic device 210 may receive wearing position information from the external electronic device 230. The first electronic device 210 may determine, based on the received wearing position data, that the first electronic device 210 is the primary device, or that the second electronic device 220 is the primary device.

The information regarding the position in which the external electronic device 230 is worn may include information including one of left wrist or right wrist. It will be assumed in the following description that, based on the wearing position information of the external electronic device 230 worn on the left wrist, the first electronic device 210 worn in the left ear (same direction) is determined as the primary device, but various embodiments are not limited thereto.

According to an embodiment of the disclosure, the first electronic device 210 operating as the primary may communicate with the second electronic device 220 operating as the secondary by using a second communication link (for example, second communication link 202 or 302 in FIG. 2 or 3). For example, the second electronic device 220 may play the secondary role and may communication-connect to the first electronic device 210 (primary) through the second communication link 202 or 302.

According to an embodiment of the disclosure, the first electronic device 210 may communicate with the second electronic device 220 through the second communication link 202 or 302 such that the second electronic device 220 sniffs and acquires audio data received from the external electronic device 230. According to an embodiment of the disclosure, the first electronic device 210 may control the second electronic device 220 through the second communication link 202 or 302 such that received audio data is output together. According to an embodiment of the disclosure, the first electronic device 210 operating as the primary device may identify battery residual capacity information (for example, battery level) of the first electronic device 210 and the second electronic device 220 in operation 805. For example, the first electronic device 210 operating as the primary device may acquire battery residual capacity information through the power management circuit 316 of the first electronic device 210 and may receive battery residual capacity information of the second electronic device 220 from the second electronic device 220.

According to an embodiment of the disclosure, based on battery level monitoring of the first electronic device 210 and the second electronic device 220, the first electronic device 210 may identify whether a primary device change event occurs in operation 807. For example, the primary device change event may include a case in which the difference in battery level between the first electronic device 210 and the second electronic device 220 is equal to or greater than a designated value.

According to an embodiment of the disclosure, when the primary device change event has occurred, the first electronic device 210 may request the external electronic device 230 to provide situation information used to determine whether to change the primary device in operation 809.

According to an embodiment of the disclosure, the electronic device 210 may receive situation information from the external electronic device 230 in operation 811, and may determine, based on the received situation information, whether to change the primary device in operation 813. Various pieces of situation information may include, for example, position information including whether the external electronic device 230 is currently positioned outdoors, exercise information indicating whether the user who wears the external electronic device 230 is currently exercising, and audio information including whether the first electronic device 210 receives a sound signal including audio data from the external electronic device 230.

According to an embodiment of the disclosure, when it has been determined to change the primary device role, the first electronic device 210 may notify the second electronic device 220 that the primary device role is to be changed, thereby changing the primary device role in operation 815.

According to an embodiment of the disclosure, when a role change is determined, the first electronic device 210 may request the second electronic device 220 to prepare a role switch through the second communication link 202 or 302.

According to an embodiment of the disclosure, according to the role switch preparation request of the first electronic device 210, the second electronic device 220 may perform relevant operations to play the primary role, not secondary role. For example, the second electronic device 220 may start an operation for switching the communication link (for example, third communication link 203 or 303 in FIG. 2 or 3) with the external electronic device 230 from an idle state to a connected state, or for newly establishing the same.

According to an embodiment of the disclosure, the second electronic device 220 may start playing the primary role after a designed time lapses or upon receiving a role change confirmation message from the second electronic device 202.

According to an embodiment of the disclosure, the first electronic device 210 may notify the external electronic device 230 that a role switch is to occur, after a designated time lapses, or when the second electronic device 220 is ready to play the primary role. According to an embodiment of the disclosure, the first electronic device 210 may transmit a role change message to the second electronic device 220 so as to play the primary role, and may switch to the secondary role. For example, the first electronic device 210 may switch the first communication link 201 or 301 with the external electronic device 230 to an idle state or may disconnect the same, upon switching to the secondary role.

According to an embodiment of the disclosure, after a role change to the primary device, the second electronic device 220 may establish or connect a third communication link 202 or 302 with the external electronic device 230 and may communicate therewith. For example, the third communication link 603 may be switch from an idle state to a connected state or may be newly established.

According to an embodiment of the disclosure, the second electronic device 220 may, as the primary, communication with the external electronic device 230 through the third communication link 202 or 302, thereby receiving audio data, and may control the first electronic device 210 so as to sniff and receive the same.

Figure 9:
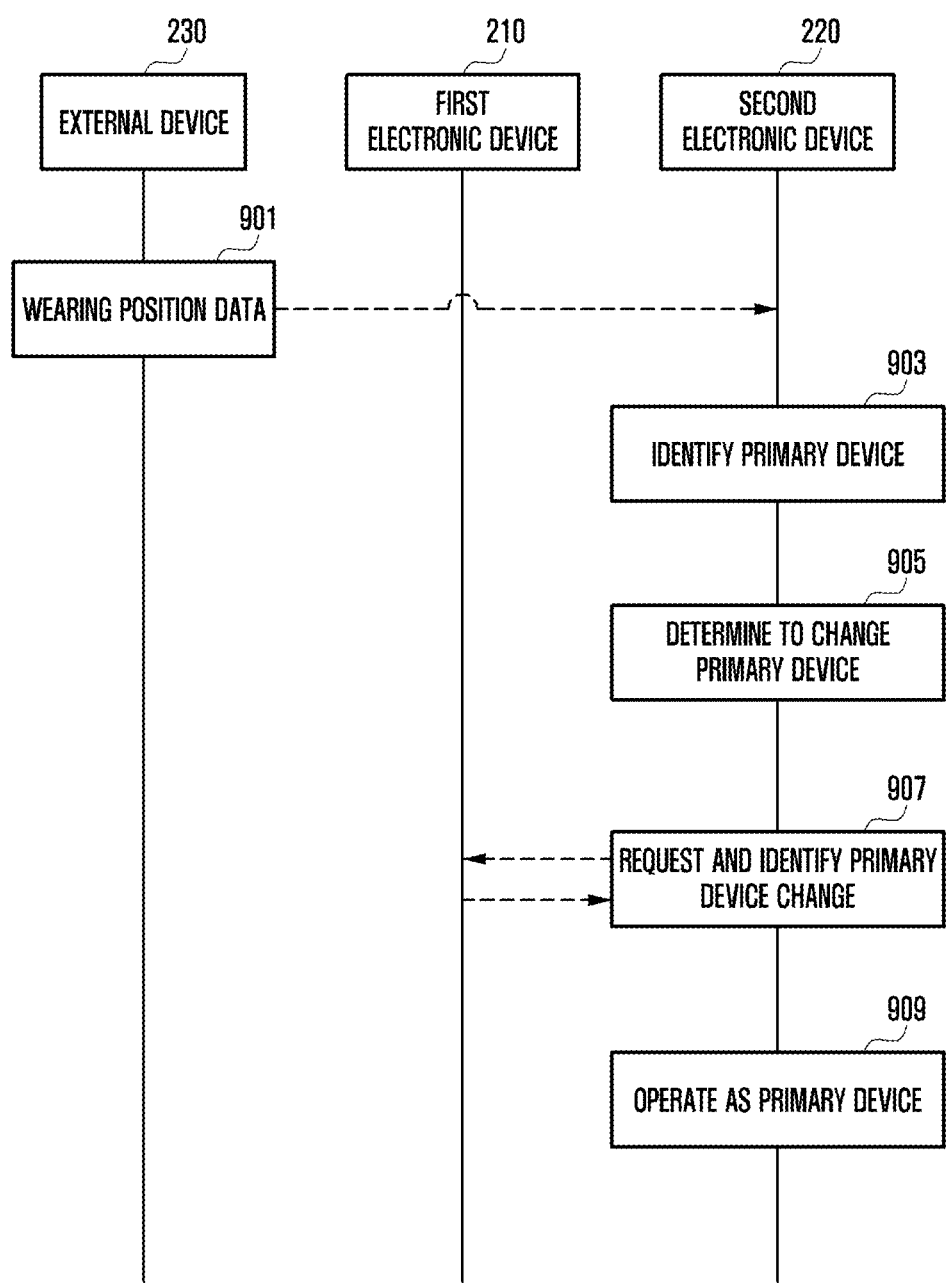
FIG. 9 illustrates a flowchart illustrating operations of an external electronic device for controlling multiple electronic devices according to an embodiment of the disclosure.

FIG. 9 illustrates a flowchart illustrating operations for controlling multiple electronic devices according to an embodiment of the disclosure.

Referring to FIG. 9, the multiple electronic devices (for example, first electronic device 210 and/or the second electronic device 220 in FIG. 2 or 3) may connect communication with an external electronic device (for example, external electronic device 230 in FIG. 2 or 3) and may receive information regarding the position in which the external electronic device 230 is worn in operation 901.

According to an embodiment of the disclosure, the first electronic device 210 and/or the second electronic device 220 may connect to the external electronic device 230 by using a first communication link 201 and/or a third communication link 203 (for example, first network 198 in FIG. 1) including a short-range communication network, such as Bluetooth™ (or BLE), Wi-Fi Direct, or infrared data association (IrDA) and may perform wireless communication, thereby receiving information regarding the position in which the external electronic device 230 is worn.

When the second electronic device 220 receives information regarding the position in which the external electronic device 230 is worn, the second electronic device 220 may be a device operating as the secondary device at the timepoint at which the wearing position information is received. For example, the second electronic device 220 may receive wearing position information from the external electronic device 230 while the first electronic device 210 operates as the primary device and the second electronic device 220 as the secondary device. It will be assumed in the following description that the second electronic device 220 receives wearing position information from the external electronic device 230, but the same may be similarly applied to a case in which the first electronic device 210 receives wearing position information from the external electronic device 230.

According to an embodiment of the disclosure, the second electronic device 220 may identify the primary device based on wearing position data in operation 903 and may identify that the second electronic device 220 operates as the secondary device in operation 903.

According to an embodiment of the disclosure, the second electronic device 220 may determine itself as the primary device, based on wearing position information of the external electronic device 230, in operation 905. For example, based on wearing position information of the external electronic device 230 worn on the right wrist, the second electronic device 220 worn on the right ear (same direction) may determine itself as the primary device.

According to an embodiment of the disclosure, after determining that the second electronic device 220 is the primary device, the second electronic device 220 may transmit a primary device switching related signal to the first electronic device 210, thereby requesting a primary device change, and may receive a confirmation regarding the same, in operation 907.

Accordingly, the second electronic device 220 may operate as the primary device in operation 909 so as to communicate with the first electronic device 210 operating as the secondary device and to transmit/receive various pieces of information with the external electronic device 230.

According to various embodiments of the disclosure, a method for controlling multiple electronic devices (for example, first electronic device 210 and second electronic device 220 in FIG. 2, 3, or 4) may include receiving information indicating a position in which an external electronic device (for example, external electronic device 230 in FIG. 2, 3, or 4) is worn from at least one (for example, first electronic device 210 in FIG. 2, 3, or 4) of the multiple electronic devices, and determining, based on the information indicating the position in which the external electronic device is worn, that a first electronic device among the external electronic device plays a primary device role.

According to various embodiments of the disclosure, the first electronic device may be a device worn in a direction identical to the position in which the external electronic device is worn.

According to various embodiments of the disclosure, the method may further include determining whether to change the primary device role based on battery level information of the multiple electronic devices.

According to various embodiments of the disclosure, whether to change the primary device role may be determined when a difference in battery level is equal to or greater than a designated value, based on battery level information of the first electronic device and a second electronic device determined as a secondary device among the multiple electronic devices.

According to various embodiments of the disclosure, the method may further include receiving situation information from the external electronic device, by the first electronic device or the second electronic device, and whether to change the primary device role may be determined by additionally considering the situation information.

According to various embodiments of the disclosure, the situation information may include position information of the external electronic device and information regarding whether a wearer of the external electronic device is exercising or whether audio data is transmitted from the external electronic device.

According to various embodiments of the disclosure, when the position information of the external electronic device indicates an outdoor position, a determination may be made to change the primary device role when the wearer is not exercising, and when the audio data is not transmitted, and when the position information of the external electronic device indicates an outdoor position, the first electronic device may maintain the primary device role when the wearer is exercising, or when the audio data is transmitted.

According to various embodiments of the disclosure, when the position information of the external electronic device may indicate an indoor position, a determination may be made to change the primary device role when the wearer is not exercising, or when the audio data is not transmitted, and when the position information of the external electronic device indicates an indoor position, a determination may be made such that the first electronic device may maintain the primary device role when the wearer is exercising, and when the audio data is transmitted.

According to various embodiments of the disclosure, the method may further include transmitting, by the first electronic device, a signal related to a primary device role change, when the first electronic device is determined as playing the primary device role while operating as a secondary device, through a communication link with a second electronic device determined as operating as a secondary device among the multiple electronic devices.

According to various embodiments of the disclosure, the second electronic device may be configured to assign priority to data retransmission from the external electronic device in connection with a communication link with the external electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of an electronic device, the method comprising:
   receiving information indicating a wearing position in which a first external electronic device is worn by a user from the first external electronic device;
   based on the information indicating the wearing position in which the first external electronic device is worn by the user, determining that the electronic device plays a primary device role with respect to a second external electronic device, the second external electronic device being connected with the electronic device to perform a function with the electronic device;
   establishing a communication link with the second external electronic device as the primary device role; and
   transmitting data through the communication link,
   wherein the electronic device is determined as playing the primary device role in a case that the electronic device is worn by the user at a same side as the first external electronic device with respect to the user.

2. The method of claim 1, further comprising determining whether to change the primary device role based on battery level information of the electronic device and the second external electronic device.

3. The method of claim 1, wherein whether to change the primary device role is determined in a case that a difference in battery level is equal to or greater than a designated value, based on battery level information of the electronic device and the second external electronic device determined as a secondary device.

4. The method of claim 3, further comprising:
   receiving situation information from the first external electronic device, by the electronic device or the second external electronic device,
   wherein whether to change the primary device role is determined by additionally considering the situation information.

5. The method of claim 4, wherein the situation information comprises position information of the first external electronic device and information regarding whether the user is exercising or whether audio data is transmitted from the first external electronic device.

6. The method of claim 5,
   wherein, in a case that the position information of the first external electronic device indicates an outdoor position, a determination is made to change the primary device role in a case that the user is not exercising, and in a case that the audio data is not transmitted, and
   wherein, in a case that the position information of the first external electronic device indicates an outdoor position, the electronic device maintains the primary device role in a case that the user is exercising, or in a case that the audio data is transmitted.

7. The method of claim 5,
wherein in a case that the position information of the first external electronic device indicates an indoor position, a determination is made to change the primary device role in a case that the user is not exercising, or in a case that the audio data is not transmitted, and
wherein, in a case that the position information of the first external electronic device indicates an indoor position, a determination is made such that the electronic device maintains the primary device role in a case that the user is exercising, and in a case that the audio data is transmitted.

8. The method of claim 1, further comprising transmitting, by the electronic device, a signal related to a primary device role change, in a case that the electronic device is determined as playing the primary device role while operating as a secondary device, through a communication link with the second external electronic device determined as operating as a secondary device.

9. The method of claim 8, wherein the second external electronic device is configured to assign priority to data retransmission from the first external electronic device in connection with a communication link with the first external electronic device.

10. An electronic device comprising:
memory;
a battery;
a speaker;
a communication module; and
at least one processor electrically connected to the memory, the battery, the speaker, and the communication module,
wherein the memory stores instructions that, when executed by the at least one processor individually or collectively, cause the electronic device to:
receive information indicating a wearing position in which a first external electronic device is worn by a user from the first external electronic device,
determine, based on the information indicating the wearing position of the first external electronic device, that the electronic device plays a primary device role with respect to a second external electronic device, the second external electronic device being connected with the electronic device to perform a function with the electronic device,
establish a communication link with the second external electronic device as the primary device role, and
transmit data through the communication link,
wherein the electronic device is determined as playing the primary device role in a case that the electronic device is worn by the user at a same side as the first external electronic device with respect to the user.

11. The electronic device of claim 10, wherein the instructions further cause the electronic device to determine whether to change a primary device role, based on battery level information of the electronic device and second external electronic device, in a case that the electronic device is determined as the primary device.

12. The electronic device of claim 11, wherein, in a case that a determination is made to change the primary device role, the instructions further cause the electronic device to transmit a signal related to a primary device role change to the second external electronic device operating as a secondary device.

13. The electronic device of claim 10, wherein the instructions further cause the electronic device to determine whether to change a primary device role in a case that a difference in battery level is equal to or greater than a designated value, based on battery level information of the battery and battery level information of the second external electronic device determined as a secondary device.

14. The electronic device of claim 10, wherein the instructions further cause the electronic device to:
receive situation information from the first external electronic device, and
determine whether to change a primary device role by additionally considering the situation information.

15. The electronic device of claim 14, wherein the situation information comprises position information of the first external electronic device and information regarding whether the user is exercising or whether audio data is transmitted from the first external electronic device.

16. The electronic device of claim 15,
wherein, in a case that the position information of the first external electronic device indicates an outdoor position, the instructions further cause the electronic device to determine to change the primary device role in a case that the user is not exercising, and in a case that the audio data is not transmitted, and
wherein, in a case that the position information of the first external electronic device indicates an outdoor position, the instructions further cause the electronic device to determine to maintain the primary device role in a case that the user is exercising, or in a case that the audio data is transmitted.

17. The electronic device of claim 15,
wherein in a case that the position information of the first external electronic device indicates an indoor position, the instructions further cause the electronic device to determine to change the primary device role in a case that the user is not exercising, or in a case that the audio data is not transmitted, and
wherein, in a case that the position information of the first external electronic device indicates an indoor position, the instructions further cause the electronic device to determine to maintain the primary device role in a case that the user is exercising, and in a case that the audio data is transmitted.

18. The electronic device of claim 10, wherein, in a case that the electronic device is determined as the primary device, based on information indicating a position in which the first external electronic device is worn, while the electronic device operates as a secondary device, the instructions further cause the electronic device to transmit a primary device role change request signal to the second external electronic device determined as a secondary device.

\* \* \* \* \*